US011914899B2

(12) United States Patent
Kong et al.

(10) Patent No.: US 11,914,899 B2
(45) Date of Patent: Feb. 27, 2024

(54) SYSTEM FOR MANAGING ACCESS TO A MEMORY RESOURCE BY MULTIPLE USERS

(71) Applicant: Microchip Technology Incorporated, Chandler, AZ (US)

(72) Inventors: Kwok Kong, Cupertino, CA (US); William Brent Wilson, Belcarra (CA); Ihab Jaser, San Jose, CA (US); Donia Sebastian, Fair Oaks, CA (US); Dan McLeran, Loveland, CO (US)

(73) Assignee: Microchip Technology Incorporated, Chandler, AZ (US)

( * ) Notice: Subject to any disclaimer, the term of this patent is extended or adjusted under 35 U.S.C. 154(b) by 84 days.

(21) Appl. No.: 17/744,171

(22) Filed: May 13, 2022

(65) Prior Publication Data

US 2023/0135952 A1 May 4, 2023

Related U.S. Application Data

(60) Provisional application No. 63/273,398, filed on Oct. 29, 2021.

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

2018/0217951 A1* 8/2018 Benisty ............... G06F 13/1642

OTHER PUBLICATIONS

NVME Workgroup, "NVM Express Base Specification, Revision 2.0," Chapters 1-4, URL:https://nvmexpress.org/wp-content/uploads/NVM-Express-Base-Specification-2_0-2021.06.02-Ratified-5.pdf, 155 pages, May 13, 2021.
International Search Report and Written Opinion, Application No. PCT/US2022/047543, 16 pages, dated Feb. 3, 2023.

* cited by examiner

*Primary Examiner* — Zachary K Huson
(74) *Attorney, Agent, or Firm* — SLAYDEN GRUBERT BEARD PLLC

(57) ABSTRACT

A system (e.g., NVMe controller) for managing access to a memory resource by multiple users may include memory storing function queue categorizations for function queues associated with each user, and circuitry to store and execute a multi-user arbitration algorithm that arbitrates access to the memory resource by the multiple users. The function queue categorizations assign a function category to each function queue associated with each user. The multi-user arbitration algorithm includes (a) selecting an intra-user winning function queue for each respective user by performing an intra-user function queue arbitration of the function queues associated with the respective user based on the function queue categorizations associated with the arbitrated function queues, (b) selecting an inter-user winning function queue by performing an inter-user function queue arbitration of the intra-user winning function queues selected for the multiple users, and (c) serving a function from the inter-user winning function queue to the memory resource.

27 Claims, 10 Drawing Sheets

SYSTEM FOR MANAGING ACCESS TO A MEMORY RESOURCE BY MULTIPLE USERS

RELATED PATENT APPLICATION

This application claims priority to commonly owned U.S. Provisional Patent Application No. 63/273,398 filed Oct. 29, 2021, the entire contents of which are hereby incorporated by reference for all purposes.

TECHNICAL FIELD

The present disclosure relates to managing access to memory resources, and more particularly to a system for managing access to a memory resource by multiple users.

BACKGROUND

A computer system may include a memory resource (e.g., a solid-state storage device, main memory, cache memory, backup memory, or other non-volatile memory (NVM) device) used by various functions (or "commands") associated with the computer system. For example, multiple different functions related to the operation of the computer system may share access to the memory resource to retrieve relevant data stored in the memory resource.

Various algorithms or protocols may be used for managing (arbitrating) access to the memory resource by the multiple different functions. FIGS. 1A-1C illustrate three common arbitration algorithms 100a-100c for managing accessing to a memory resource by multiple functions. Each arbitration algorithm 100a-100c selectively serves individual functions to the memory resource in a sequential manner.

First, FIG. 1A shows a Round Robin (RR) arbitration algorithm 100a for managing access to the memory resource. Functions may be assigned to example function queues FQ1-FQ3 according to any suitable categorization protocol or rules. Function queues are also commonly referred to as submission queues. The RR arbitration algorithm 100a may select individual functions from the three function queues FQ1-FQ3 in a rotating, round robin manner. A function queue FQ1-FQ3 is skipped if there are no functions in the respective function queue when the respective function queue is selected by the RR arbitration algorithm 100a.

Next, FIG. 1B shows a Weighted Round Robin (WRR) arbitration algorithm 100b for managing access to the memory resource from the example function queues FQ1-FQ3. Each function queue FQ1-FQ3 (and the functions within the respective function queue FQ1-FQ3) may be assigned a different weight, e.g., based on a respective priority or importance associated with each functions. For example, as shown, FQ1, FQ2, and FQ3 may have assigned weights "W" of X, Y, and Z, respectively. The WRR arbitration algorithm 100b rotates through the function queues FQ1-FQ3 in a round robin manner, and selects a consecutive number of functions from each function queue FQ1-FQ3 as a function of the different weights assigned to the function queues FQ1-FQ3 when the function queue is selected. For example, WRR arbitration algorithm 100b may serve X consecutive functions from function queue FQ1, followed by Y consecutive functions from function queue FQ2, followed by Z consecutive functions from function queue FQ3, following by X consecutive functions from function queue FQ1, and so on. A function queue FQ1-FQ3 is skipped if there are no functions in the respective function queue when the respective function queue is selected by the WRR arbitration algorithm 100b.

Next, FIG. 1C shows a Strict Priority (SP) arbitration algorithm 100c for managing access to the memory resource from the example function queues FQ1-FQ3. Each function queue FQ1-FQ3 (and the functions within the respective function queue FQ1-FQ3) may be assigned a different priority level, e.g., based on a respective priority or importance associated with each functions. For example, as shown, FQ1, FQ2, and FQ3 may have assigned priority levels "P" of 1 (high priority), 2 (medium priority), and 3 (low priority), respectively. SP arbitration algorithm 100c will serve all functions from the highest priority function queue FQ1 (P=1) whenever any function is present in FQ1. When there are no functions present in FQ1, SP arbitration algorithm 100c will serve all functions from the medium priority function queue FQ2 (P=2). SP arbitration algorithm 100c will serve functions from the low priority function queue FQ3 (P=3) only when no functions are present in FQ1 or FQ2.

In an NVM Express (NVMe) environment, an NVMe controller may manage access to a memory resource by various functions from a single user (e.g., a processor core or group of cores) according to an arbitration protocol specified in an NVMe specification. An example representation of the NVMe specification arbitration protocol 200 is shown in FIG. 2. Arbitration protocol 200 is used to arbitrate multiple function queues (FQs) associated with a single user, over a series of recurrent executions of the arbitration protocol 200, to select a series of functions to serve to a memory resource.

Each execution of the arbitration protocol 200 selects a particular FQ from the multiple FQs associated with the user, and a function queued in the selected FQ is served to the memory resource. In some examples, for each selected FQ (resulting from each respective execution of the arbitration protocol 200), the function queued at the front of the selected FQ, referred to herein as a "queue-front function," is served to the memory resource. In other examples another queued function (i.e., other then the queue-front function, for the example the second-to-front function, the rear-most (i.e., most recently queued) function, or any other function) may be served from a selected FQ.

As shown, the arbitration protocol 200 defines five categories of FQs (Admin FQ, Urgent FQs, High Priority FQs, Medium Priority FQs, and Low Priority FQs) and three levels of arbitration (indicated as Arbitration Level 1, Arbitration Level 2, and Arbitration Level 3). Arbitration Level 1 includes a respective Round Robin (RR) arbitration for each of Urgent FQs, High Priority FQs, Medium Priority FQs, and Low Priority FQs. The High Priority FQ, Medium Priority FQ, and Low Priority FQ selected in Arbitration Level 1 are then arbitrated at Arbitration Level 2 using a Weighted Round Robin (WRR) arbitration, in which the High Priority FQ is assigned a high weight, the Medium Priority FQ is assigned a medium weight, and the Low Priority FQ is assigned a low weight (wherein the high weight, medium weight, and low weight may have any suitable values). The FQ selected by the WRR arbitration is then arbitrated with (a) the Urgent FQ selected by the RR arbitration in Arbitration Level 1 and (b) the Admin FQ using a Strict Priority (SP) arbitration at Arbitration Level 3. The priority levels (Strict Priority 1, Strict Priority 2, and Strict Priority 3) of the three arbitrated FQ are shown in FIG. 2. A selected function in the FQ selected by the SP arbitration (e.g., the queue-front function from the selected FQ) is then served to the memory resource, and the arbitration process may then be repeated to select a next function to serve.

There is a need for managing access to a memory resource shared by multiple users (e.g., processor cores). For example, there is a need for systems and methods for arbitrating multiple function queues (include respective functions) from multiple different users (e.g., processor cores) by an NVMe controller.

SUMMARY

Systems and methods are provided for managing access to a memory resource shared by multiple users (e.g., processor cores). In some examples, a multi-user arbitration algorithm is executed by a memory access controller, e.g., an NVMe controller, to select a function to serve to a memory resource (e.g., an NVM device), wherein the function is selected from multiple functions associated with the multiple users.

One aspect provides a system for managing access to a memory resource by multiple users. The system includes a memory storing function queue categorizations for a plurality of function queues associated with each respective user of the multiple users, wherein the function queue categorizations assign a respective function category of multiple predefined function categories to each respective function queue associated with each respective user. The system also includes circuitry to store and execute a multi-user arbitration algorithm to (a) select an intra-user winning function queue for each respective user of the multiple users by performing, for each respective user, an intra-user function queue arbitration of the function queues associated with the respective user based at least on the function queue categorizations assigned to the function queues associated with the respective user, (b) select an inter-user winning function queue by performing an inter-user function queue arbitration of the respective intra-user winning function queues selected for each of the multiple users; and (c) serve a function from the inter-user winning function queue to the memory resource.

In some examples, the system comprises a non-volatile memory express (NVMe) controller, and the memory resource comprises a non-volatile memory (NVM) device.

In some examples, zero, one, or multiple functions are queued in each function queue.

In some examples, the intra-user function queue arbitration of the plurality of function queues associated with the respective user comprises a multi-level intra-user arbitration including at least two intra-user arbitration levels.

In some examples, the intra-user function queue arbitration of the plurality of function queues associated with each respective user comprises a multi-level arbitration including (a) an intra-user first arbitration level that selects multiple intra-user first level winning function queues, and (b) an intra-user second arbitration level that arbitrates the multiple intra-user first level winning function queues.

In some examples, the intra-user function queue arbitration of the plurality of function queues associated with each respective user comprises a multi-level intra-user arbitration including at least three intra-user arbitration levels.

In some examples, the inter-user function queue arbitration of the respective intra-user winning function queues selected for the multiple users comprises a multi-level arbitration including at least two inter-user arbitration levels.

In some examples, the inter-user function queue arbitration of the respective intra-user winning function queues selected for the multiple users comprises (a) an inter-user first arbitration level that selects multiple inter-user first level winning function queues, and (b) a second inter-user arbitration level that arbitrates the multiple first inter-user level winning function queues.

In some examples, the inter-user function queue arbitration of the respective intra-user winning function queues selected for the multiple users includes a round robin arbitration between function queues associated with different users.

In some examples, the inter-user function queue arbitration of the respective intra-user winning function queues selected for the multiple users includes a weighted round robin arbitration, wherein different weights are assigned to different users.

In some examples, the memory stores user class data assigning a user class to each respective user of the multiple users, and the multi-user arbitration algorithm defines multiple class-specific inter-user function queue arbitrations for arbitrating intra-user winning function queues. The circuitry to execute the multi-user arbitration algorithm to select the inter-user winning function queue by performing the inter-user function queue arbitration of the respective intra-user winning function queues selected for the multiple users comprises circuitry to execute the multi-user arbitration algorithm to (a) identify the user class assigned to each respective user of the multiple users, (b) assign the respective intra-user winning function queue selected for each respective user to one of the multiple class-specific inter-user function queue arbitrations based on the user class assigned to the respective user, and (c) select a class-specific winning function queue for each of the multiple class-specific inter-user function queue arbitrations.

In some examples, the memory stores user weight data defining user weights assigned to at least some of the multiple users, and the circuitry to execute the multi-user arbitration algorithm to select the inter-user winning function queue by performing the inter-user function queue arbitration of the intra-user winning function queues selected for each of the multiple users comprises circuitry to execute the multi-user arbitration algorithm to perform a weighted round robin arbitration for a selected set of the intra-user winning function queues associated with a selected set of users based at least on user weights assigned to the selected set of users as defined by the user weight data.

In some examples, the circuitry to store and execute the multi-user arbitration algorithm comprises a digital logic circuit defining the multi-user arbitration algorithm.

In some examples, the circuitry to store and execute the multi-user arbitration algorithm includes non-transitory computer-readable media storing instructions defining the multi-user arbitration algorithm, and a processor to execute the instructions to perform the multi-user arbitration algorithm.

Another aspect provides a method for managing access to a memory resource by multiple users. The method includes assigning function queue categorizations to each of a plurality of function queues associated with each respective user of the multiple users, the function queue categorizations assigning a respective function category of multiple predefined function categories to each respective function queue associated with each respective user, and storing the function queue categorizations in a memory device. The method also includes using circuitry to execute a multi-user arbitration algorithm that arbitrates access to the memory resource by the multiple users, wherein executing the multi-user arbitration algorithm comprises (a) selecting an intra-user winning function queue for each respective user of the multiple users by performing, for each respective user, an intra-user function queue arbitration of the function queues associated with the respective user based at least on the function queue categorizations assigned to the function queues associated with the respective user, (b) selecting an inter-user winning function queue by performing an inter-user function queue arbitration of the intra-user winning function queues selected for each of the multiple users, and (c) serving a function from the inter-user winning function queue to the memory resource.

In some examples, the circuitry to execute the multi-user arbitration algorithm comprises a processor of a non-volatile memory express (NVMe) controller executing computer-readable instructions defining the multi-user arbitration algorithm.

In some examples, the circuitry to execute the multi-user arbitration algorithm comprises a digital logic circuit of a non-volatile memory express (NVMe) controller.

In some examples, zero, one, or multiple functions are queued in each function queue.

In some examples, performing the intra-user function queue arbitration of the plurality of function queues associated with each respective user comprises performing a multi-level intra-user arbitration including at least two intra-user arbitration levels.

In some examples, performing the intra-user arbitration of the plurality of function queues associated with each respective user comprises performing a multi-level intra-user arbitration including (a) executing an intra-user first arbitration level that selects multiple intra-user first level winning function queues, and (b) executing an intra-user second arbitration level that arbitrates the multiple intra-user first level winning function queues.

In some examples, performing the intra-user function queue arbitration of the plurality of function queues associated with each respective user comprises performing a multi-level intra-user arbitration including at least three intra-user arbitration levels.

In some examples, performing the inter-user arbitration of the respective intra-user winning function queues selected for the multiple users comprises performing a multi-level inter-user arbitration including at least two inter-user arbitration levels.

In some examples, performing the inter-user arbitration of the respective intra-user winning function queues selected for the multiple users comprises performing a multi-level inter-user arbitration including (a) executing an inter-user first arbitration level that selects multiple inter-user first level winning function queues, and (b) executing a second inter-user arbitration level that arbitrates the multiple first inter-user level winning function queues.

In some examples, performing the inter inter-user arbitration of the respective intra-user winning function queues selected for the multiple users includes performing a weighted round robin arbitration, wherein different weights are assigned to different users.

In some examples, the method includes storing user class data assigning a user class to each respective user of the multiple users, and wherein selecting an inter-user winning function queue by performing an inter-user function queue arbitration of the respective intra-user winning function queues selected for the multiple users includes (a) identifying the user class assigned to each respective user of the multiple users, (b) assigning the respective intra-user winning function queue selected for each respective user to one of multiple class-specific inter-user function queue arbitrations based on the user class assigned to the respective user, and (c) selecting a class-specific winning function queue for each of the multiple class-specific inter-user function queue arbitrations.

In some examples, the method includes storing user weight data defining user weights assigned to at least some of the multiple users, and wherein selecting an inter-user winning function queue by performing an inter-user function queue arbitration of the respective intra-user winning function queues selected for the multiple users includes performing a weighted round robin arbitration for a selected set of the intra-user winning function queues associated with a selected set of users based at least on user weights assigned to the selected set of users as defined by the user weight data.

BRIEF DESCRIPTION OF THE DRAWINGS

Example aspects of the present disclosure are described below in conjunction with the figures, in which.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Systems and methods are provided for managing access to a memory resource shared by multiple users (e.g., processor cores). Some examples provide systems and methods for arbitrating multiple function queues associated with multiple users in an NVM Express (NVMe) environment, including execution of a multi-user arbitration algorithm by an NVMe controller.

Figure 3A:
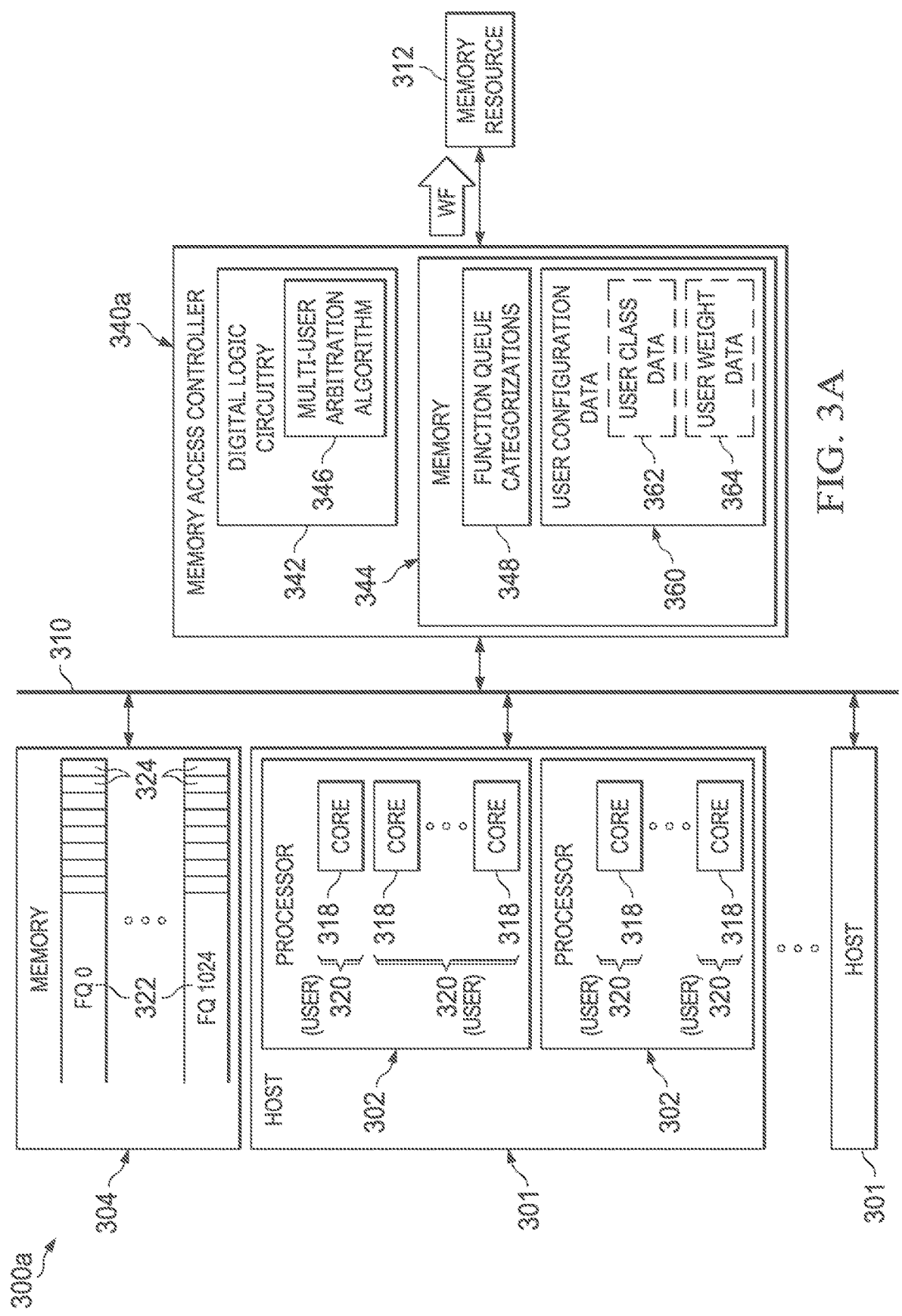
FIG. 3A shows an example system for managing access to a memory resource by multiple users, wherein the system includes a multi-user arbitration algorithm embodied in digital logic circuity.

FIG. 3A shows an example system 300a for managing access to a memory resource by multiple users. System 300a includes one or multiple hosts 301, a memory 304, and a memory access controller 340a, all connected to a shared bus 310 (e.g., a PCI Express Bus) or otherwise communicative connected to each other. Memory access controller 340a manages access to a memory resource 312, e.g., a non-volatile memory (NVM) device.

Each host 301 may include one or more processor 302. Each processor 302 may comprise a CPU or other microprocessor, and may include one or multiple cores 318.

System 300a may define a plurality of "users" 320, each of which may include one or multiple cores 318. Each user 320 may generate a series of commands or "functions" 324 needing access to the memory resource 312 for completing a particular task. Functions 324 may be associated with the operation of memory access controller 340a, memory resource 312, and/or any other component of system 300a or other device communicatively connected to processor 302.

Functions 324 generated by users 320 may be organized in a plurality of function queues (FQs) 322 stored in memory 304. Zero, one, or multiple function may be queued in each respective FQ 322 associated with each respective user 320 at any point in time. Memory 304 may comprise locally attached Dynamic Random Access Memory (DRAM) and/or Static Random Access Memory (SRAM), for example. A respective group of FQs 322 may be assigned to each user 320. The group of FQs assigned to each respective user 320 may be categorized into multiple predefined function categories, for example N different function categories representing N different priority levels, according to a set of FQ categorizations 348 (which may be stored in memory access controller 340a, as discussed below). For example, individual FQs 322 within a group of FQs 322 assigned to a particular user 320 may be assigned to respective function categories, with each of the function categories representing a respective priority level. For instance, a group of FQs 322 assigned to a particular user 320 may include a first number of FQs 322 categorized in a first function category "Admin priority," a second number of FQs 322 categorized in a second function category "Urgent priority," a third number of FQs 322 categorized in a third function category "High priority," a fourth number of FQs 322 categorized in a fourth function category "Medium priority," and a fifth number of FQs 322 categorized in a fifth function category "Low priority." Each function 324 within each respective FQ 322 is assigned the function category of the respective FQ 322.

Memory access controller 340a operates to manage access to the memory resource 312 by functions 324 from the multiple different users 320. In some examples memory access controller 340a may comprise a NVM controller, e.g., a NVMe controller for manage access to a NVM device (example memory resource 312) in an NVMe environment. In the example shown in FIG. 3A, memory access controller 340a includes digital logic circuitry 342 to store and execute a multi-user arbitration algorithm 346, and memory 344 storing FQ categorizations 348 and (optional) user configuration data 360. Memory 344 may comprise non-transitory computer-readable media for storing electronically-readable instructions and/or data, for example embedded SRAM and/or registers, for example.

As discussed above, FQ categorizations 348 may specify a function category for each of the FQs 322 assigned to each respective user 320. User configuration data 360 may include data associated with each respective user 320 (or a subset of respective users 320). For example, user configuration data 360 may include data linked to the group of FQs 322 associated with each respective user 320 (or a subset of respective users 320), such that different user configuration data 360 may be associated with different users 320. When arbitrating FQs associated with multiple different users 320, memory access controller 340a may identify for each FQ 322 being arbitrated the respective user configuration data 360 linked to corresponding user 320, and use such user configuration data 360 as input for influencing selected arbitration decisions.

In some examples, user configuration data 360 may include user class data 362, user weight data 364, and/or any other type of data associated with different users 320. User class data 362 may specify a user class assigned to each respective user 320, which may be relevant to an inter-user FQ arbitration between intra-user winning FQs selected for multiple users, as discussed below.

The multi-user arbitration algorithm 346 executed by digital logic circuitry 342 may include a two stage arbitration process including: (a) performing an intra-user FQ arbitration for each of the multiple users 320 to select an intra-user winning FQ associated with each respective user 220, and (b) performing an inter-user FQ arbitration between the intra-user winning FQs selected for multiple users to select an inter-user winning FQ, and a selected function 324 (e.g., the queue-front function) from the inter-user winning FQ, indicated as "WF" (winning function), is then served to memory resource 312 to access specific data specified in the selected function. The intra-user FQ arbitration for each respective user 320 involves selecting an intra-user winning FQ from multiple FQs 322 assigned to the respective user 320.

As discussed below with reference to FIGS. 4-6, the intra-user FQ arbitration for each user 320 may include one or multiple intra-user arbitration levels, and the inter-user FQ arbitration may include one or multiple inter-user arbitration levels. Each intra-user arbitration level and each inter-user arbitration level may include any number (one or more) of arbitration instances. The various arbitration instances with each particular arbitration level, and between different arbitration levels in the multi-user arbitration algorithm 346, may include any number and types (including multiple different types) of arbitration instances, for example, one or more round robin (RR) arbitration instances, one or more weighted round robin (WRR) arbitration instances, and/or one or more strict priority (SP) arbitration instances.

In some examples, the inter-user FQ arbitration may distinguish intra-user winning FQs selected for different users based on the user class assigned to each respective user, as defined by user class data 362. For example, as discussed below with reference to FIG. 5, the inter-user FQ arbitration may include a first inter-user arbitration level including different arbitration instances (of the same or different types of arbitration) for intra-user winning FQs from users from different user classes. For instance, first inter-user arbitration level may include a first arbitration instance for intra-user winning FQs from users assigned to a first class (according to user class data 362) and a second arbitration instance for intra-user winning FQs from users assigned to a second class (according to user class data 362).

Figure 3B:
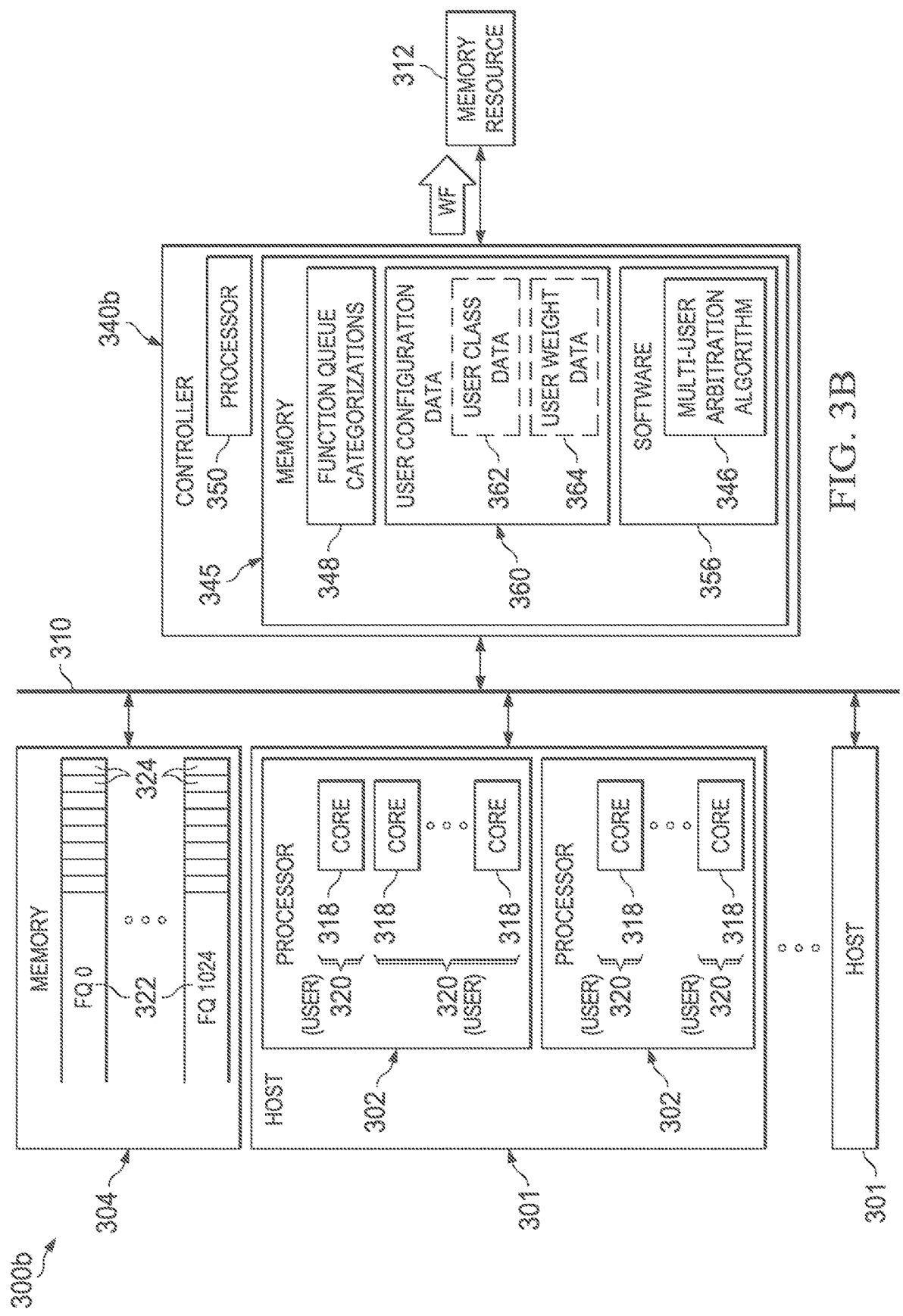
FIG. 3B shows another example system for managing access to a memory resource by multiple users, wherein the system includes a multi-user arbitration algorithm embodied in software.

FIG. 3B shows another example system 300b for managing access to a memory resource by multiple users. Example system 300b may be similar to system 300a shown in FIG. 3A, except instead of the digital logic circuitry 342 of system 300a, system 300b includes circuitry comprising a processor 350 and memory 345 storing software 356 to store and execute the multi-user arbitration algorithm 346, as discussed below, in addition to storing FQ categorizations 348 and (optional) user configuration data 360.

Software 356 may comprise non-transitory computer readable media storing instructions executable by processor 350 to execute the multi-user arbitration algorithm 346 to arbitrate FQs 322 associated with multiple users 320 to selectively serve functions 324 to memory resource 312, e.g., as discussed above regarding FIG. 3A and as discussed below with respect to FIGS. 4-8.

In some examples memory access controller 340*b* may comprise a NVM controller, e.g., a NVMe controller for manage access to a NVM device (example memory resource 312) in an NVMe environment. Memory 345 may include one or multiple types or instances of non-transitory computer-readable media for storing electronically-readable instructions and/or data. For example, FQ categorizations 348 and software 356 may be stored in memory 345 comprising embedded SRAM or external DRAM. As another example, FQ categorizations 348 and software 356 may be stored in distinct memory devices. For instance, FQ categorizations 348 may be stored in embedded SRAM, while software 356 may be stored in DRAM.

Figure 4:
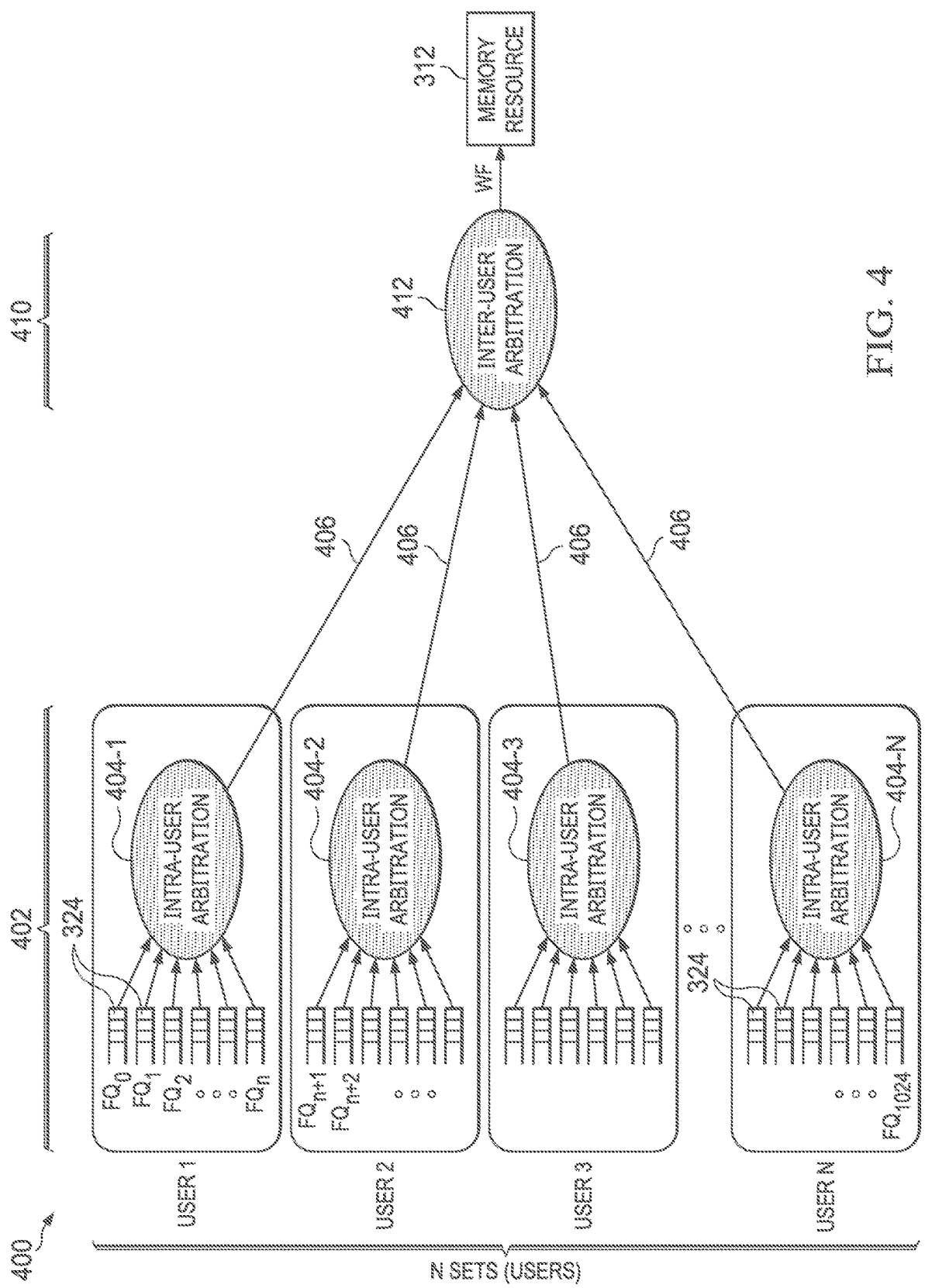
FIG. 4 shows an example multi-user arbitration algorithm, e.g., for use in the systems shown in FIG. 3A and/or FIG. 3B, to manage access to a memory resource by multiple users.

FIG. 4 shows an example multi-user arbitration algorithm 400 to manage access to a memory resource 312 by multiple users. Multi-user arbitration algorithm 400 may correspond with multi-user arbitration algorithm 346 shown in FIG. 3A and/or FIG. 3B. Thus, in some examples multi-user arbitration algorithm 400 may be stored and executed by digital logic circuitry 342 of a memory access controller 340*a* (see example system 300*a* shown in FIG. 3A) or stored in software 356 executable by a processor 350 of a memory access controller 340*b* (see example system 300*b* shown in FIG. 3B).

As shown, multi-user arbitration algorithm 400 includes an intra-user arbitration stage 402 and an inter-user arbitration stage 410. The intra-user arbitration stage 402 includes multiple intra-user arbitration modules 404, in particular a respective intra-user arbitration module 404 for each of multiple users 320.

As shown, the intra-user arbitration stage 402 includes a respective intra-user arbitration module 404 for arbitrating FQs 322 containing functions 324 generated by a respective user. Thus, intra-user arbitration stage 402 may include intra-user arbitration modules 404-1 through 404-N corresponding with User 1 through User N, respectively. Each User has an assigned group of FQs. For example, User 1 has as assigned group of FQs (FQ$_0$ through FQ$_n$). In one example, a total of 1025 FQs (FQ$_0$ through FQ$_{1024}$) are allocated among 128 Users (User 1 through User 128). The intra-user arbitration module 404 for each respective User arbitrates FQs corresponding with the respective User to select an intra-user winning FQ 406 for the respective User. For example, intra-user arbitration module 404-1 arbitrates FQ$_0$ through FQ$_n$ to select an intra-user winning FQ 406 for User 1.

Figure 5:
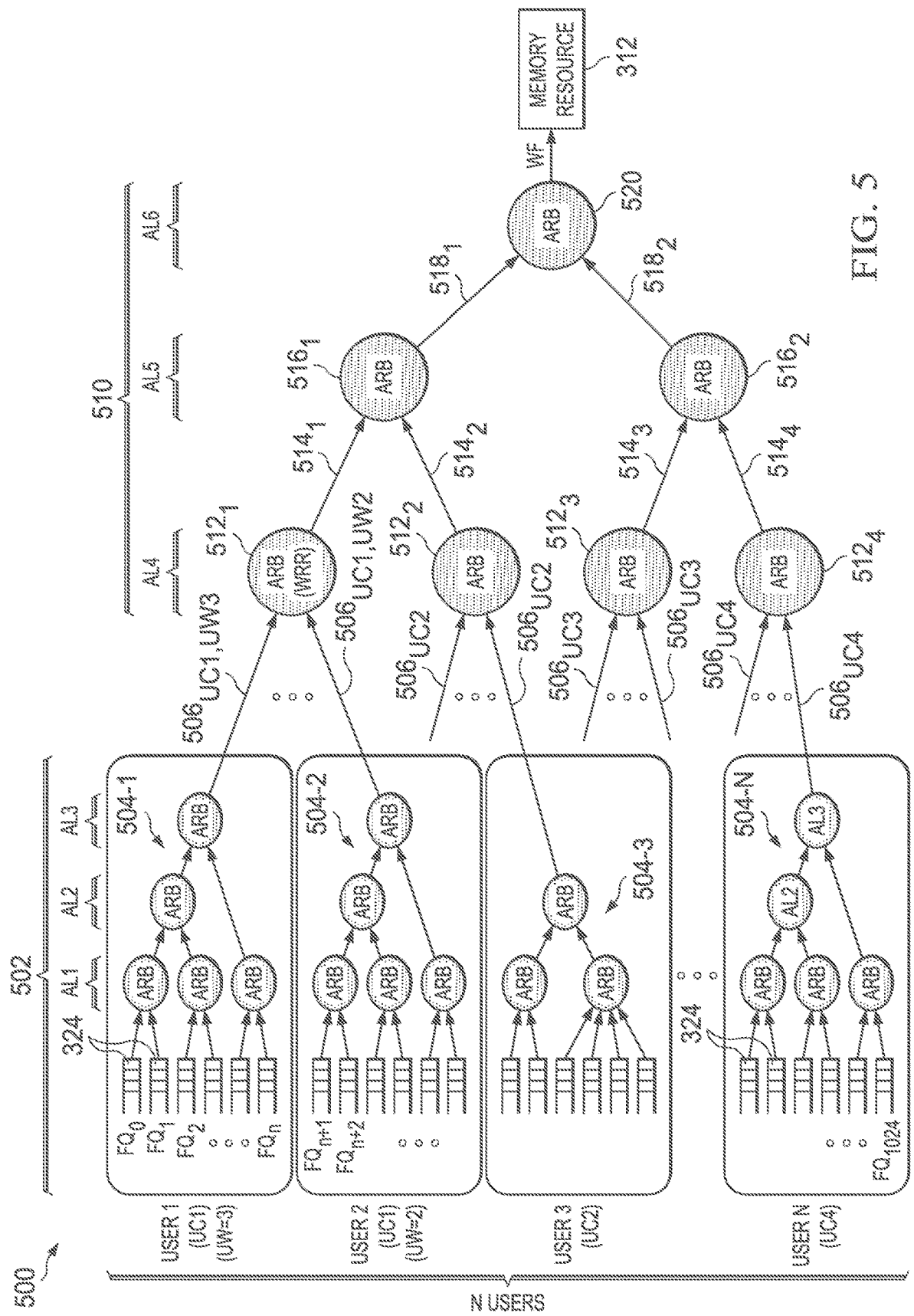
FIG. 5 shows a more detailed example of the user arbitration algorithm shown in FIG. 4.
Figure 6:
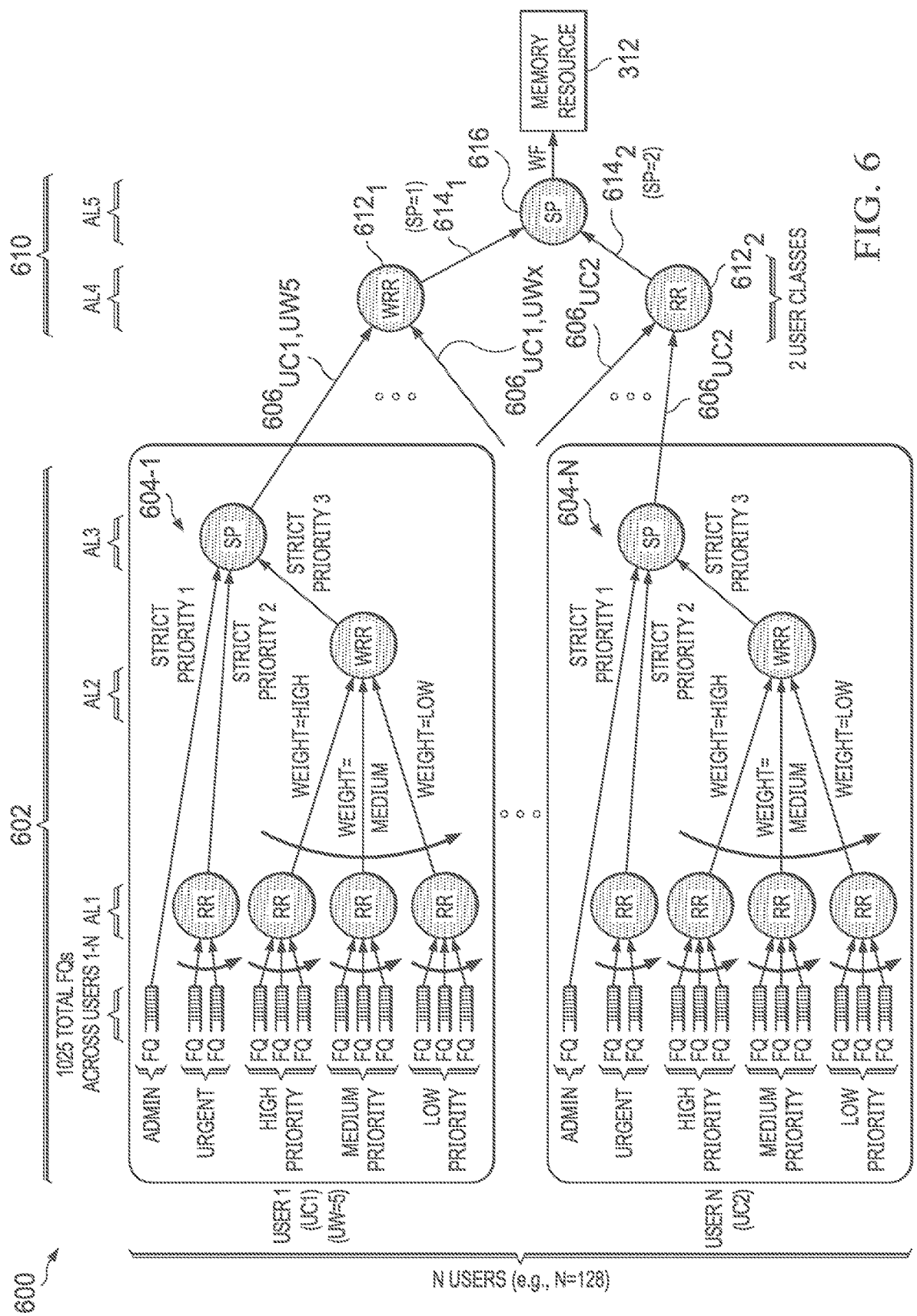
FIG. 6 shows a specific example of the user arbitration algorithm shown in FIG. 4.

Each intra-user arbitration module 404-1 through 404-N may include one or more intra-user arbitration level (e.g., one, two, three, four, or more intra-user arbitration levels), and each intra-user arbitration level may include one or multiple arbitration types (e.g., RR, WRR, or SR arbitration) and/or arbitration instances, e.g., as shown in FIGS. 5-6 discussed below. In some examples, multiple intra-user arbitration modules 404 (e.g., all intra-user arbitration modules 404, or a defined subset of intra-user arbitration modules 404) may be processed concurrently, to select a respective intra-user winning FQ 406 for each respective User 1-N. In some examples, each intra-user arbitration module 404 is independent of the other intra-user arbitration modules 404, i.e., wherein the arbitration decisions made in one intra-user arbitration module 404 do not affect the arbitration decisions made in any other intra-user arbitration module 404.

The inter-user arbitration stage 410 includes an inter-user arbitration module 412 that arbitrates the respective intra-user winning FQs 406 selected for Users 1-N (or a subset of Users 1-N) to select an inter-user winning FQ, from which the selected function 324 (or winning function, "WF") is served to memory resource 312. The inter-user arbitration stage 412 may include one or more inter-user arbitration level (e.g., one, two, three, four, or more inter-user arbitration levels), wherein each inter-user arbitration level may include one or multiple arbitration types (e.g., RR, WRR, or SR arbitration) and/or arbitration instances, e.g., as shown in FIGS. 5-6 discussed below.

FIG. 5 shows a multi-user arbitration algorithm 500 to manage access to a memory resource 312 by multiple users. Multi-user arbitration algorithm 500 may represent a more detailed example of the multi-user arbitration algorithm 400 shown in FIG. 4. Multi-user arbitration algorithm 500 may correspond with multi-user arbitration algorithm 346 shown in FIG. 3A and/or FIG. 3B. Thus, in some examples multi-user arbitration algorithm 500 may be stored and executed by digital logic circuitry 342 of a memory access controller 340*a* (see example system 300*a* shown in FIG. 3A) or stored in software 356 executable by a processor 350 of a memory access controller 340*b* (see example system 300*b* shown in FIG. 3B).

As shown, multi-user arbitration algorithm 500 includes an intra-user arbitration stage 502 and an inter-user arbitration stage 510 for arbitrating FQs assigned to User 1 through User N (also written as Users 1-N). In some examples, user configuration data 360 may be stored for Users 1-N, which may be utilized at least during the inter-user arbitration stage 510, as discussed below. For example, user configuration data 360 may include user class data 362 and/or user weight data 364 associated with each respective User 1-N.

User class data 362 may specify a user class assigned to each respective User 1-N. In the illustrated example, Users 1-N are selectively assigned to four user classes UC1, UC2, UC3, and UC4, it being understood that more user classes than 4, or less user classes than 4, may be provided in different examples. As shown, User 1 and User 2 are assigned to a first user class UC1 (and thus referred to as "UC1 users"); User 3 is assigned to a second user class UC2 (and thus referred to as a "UC2 users"); and User N (e.g., User 128) is assigned to a fourth user class UC4 (and thus referred to as a "UC4 user"). Each other user may be assigned to any user class UC1, UC2, UC3, or UC4. The user class (UC1, UC2, UC3, or UC4) assigned to each respective User 1-N may be relevant to the inter-user arbitration stage 510, as discussed below.

User weight data 364 may specify a user weight assigned to selected users of Users 1-N. In the illustrated example, intra-user winning FQs 506 selected for UC1 users (including User 1 and User 2) are arbitrated by a UC1-specific WRR arbitration instance 512$_1$ in the inter-user arbitration stage 510, as discussed below. Thus, user weight data 364 may specify a user weight (UW) assigned to each respective UC1 user (including User 1 and User 2) based on any suitable parameters, e.g., based on a payment level of each respective UC1 user. In the illustrated example, user weight data 364 assigns a weight of 3 to User 1 and assigns a weight of 2 to User 2, as indicated by the labels UW3 and UW2 displayed under User 1 and User 2, respectively.

The intra-user arbitration stage 502 includes multiple intra-user arbitration modules 504-1 through 504-N corresponding respectively with Users 1-N. Each intra-user arbitration module 504 arbitrates the FQs assigned to a respective User to select an intra-user winning FQ 506 for the respective User. For example, intra-user arbitration module 504-1 arbitrates $FQ_0$ through $FQ_n$ assigned to User 1 to select an intra-user winning FQ $506_{UC1,UW3}$ for User 1, wherein the subscript "UC1,UW3" indicates the user class UC1 and UW of 3 assigned to User 1.

Each intra-user arbitration module 504-1 through 504-N may include one or more intra-user arbitration levels (e.g., one, two, three, four, or more intra-user arbitration levels), each including one or more arbitration instance (ARB). As shown in FIG. 5, intra-user arbitration module 504-1 through 504-N may each include one or more ARB in a first intra-user arbitration level AL1, one or more ARB in a second intra-user arbitration level AL2, and/or one or more ARB in a third intra-user arbitration level AL3. As shown, example intra-user arbitration module 504-1 uses three intra-user arbitration levels (AL1, AL2, AL3) for arbitrating FQs assigned to User 1; example intra-user arbitration module 504-2 uses three intra-user arbitration levels (AL1, AL2, AL3) for arbitrating FQs assigned to User 2 (which may include the same or different arbitration types as intra-user arbitration module 504-1); and example intra-user arbitration module 504-3 uses two intra-user arbitration levels (AL1, AL2) for arbitrating FQs assigned to User 3.

Each intra-user arbitration level (AL1, AL2, or AL3) of each intra-user arbitration module 504 may include one or multiple arbitration instances (ARB). Each ARB in each intra-user arbitration level (AL1, AL2, or AL3) of each intra-user arbitration module 504 may comprise any type of arbitration, e.g., a RR arbitration, WRR arbitration, SR arbitration, or other type of arbitration. As discussed above with respect to FIG. 4, in some examples, multiple intra-user arbitration modules 504 (e.g., all intra-user arbitration modules 504, or a defined subset of intra-user arbitration modules 504) may be processed concurrently, to select an intra-user winning FQ 506 for each respective User, wherein the subscript "UCN" of each intra-user winning FQ 506 indicates the user class corresponding with the respective user (e.g., UC1, UC2, UC3, or UC4). In some examples, each intra-user arbitration module 504 is independent of the other intra-user arbitration modules 504, i.e., wherein the arbitration decisions made in one intra-user arbitration module 504 do not affect the arbitration decisions made in any other intra-user arbitration module 504.

The inter-user arbitration stage 510 arbitrates the intra-user winning FQs 506 selected for Users 1-N to select an inter-user winning FQ, from which a selected function 324 is served to memory resource 312, as discussed below. The inter-user arbitration stage 510 may include one or more inter-user arbitration level (e.g., one, two, three, four, or more inter-user arbitration levels). In the illustrated example, inter-user arbitration stage 510 includes three inter-user arbitration levels indicated as AL4, AL5, and AL6.

Each inter-user arbitration level AL4, AL5, and AL6 may include one or more arbitration instance (ARB), wherein each ARB in each inter-user arbitration level AL4, AL5, and AL6 may comprise any arbitration type (e.g., RR, WRR, SR, or other type of arbitration). In the illustrated example, a first inter-user arbitration level AL4 includes four class-specific inter-user FQ arbitrations ARB $512_1$-$512_4$, each corresponding with one of the four user classes UC1-UC4. A UC1-specific ARB $512_1$ arbitrates intra-user winning FQs $506_{UC1}$ selected for Users 1-N assigned to user class UC1 to select a first inter-user winning FQ $514_1$ (including intra-user winning FQ $506_{UC1,UW3}$ selected for User 1 and intra-user winning FQ $506_{UC1,UW2}$ selected for User 2). A UC2-specific ARB $512_2$ arbitrates intra-user winning FQs $506_{UC2}$ selected for Users 1-N assigned to user class UC2 to select a second inter-user winning FQ $514_2$. A UC3-specific ARB $512_3$ arbitrates intra-user winning FQs $506_{UC3}$ selected for Users 1-N assigned to user class UC3 to select a third inter-user winning FQ $514_3$. And a UC4-specific ARB $512_4$ arbitrates intra-user winning FQs $506_{UC4}$ selected for Users 1-N assigned to user class UC4 to select a fourth inter-user winning FQ $514_4$.

ARBs $512_1$-$512_4$ may be the same arbitration type or different arbitration types (e.g., RR, WRR, or SR). As discussed above, in the illustrated example, arbitration instance $512_1$ comprises a WRR arbitration instance to arbitrate intra-user winning FQs 506 selected for UC1 users based on the user weight associated with each respective intra-user winning FQ 506, including (a) intra-user winning FQ $506_{UC1,UW3}$ selected for User 1 (user weight=3) and (b) intra-user winning FQ $506_{UC1,UW2}$ selected for User 2 (user weight=2).

A second inter-user arbitration level AL5 includes two ARBs $516_1$ and $516_2$ to arbitrate the inter-user winning FQ $514_1$-$514_4$ selected at the first inter-user arbitration level AL4. In particular, ARB $516_1$ arbitrates the first inter-user winning FQ $514_1$ and second inter-user winning FQ $514_2$ to select an inter-user winning FQ $518_1$ and ARB $516_2$ arbitrates the third inter-user winning FQ $514_3$ and fourth inter-user winning FQ $514_4$ to select an inter-user winning FQ $518_2$. ARBs $516_1$ and $516_2$ may be the same arbitration type or different arbitration types (e.g., RR, WRR, or SR). Alternately, ARBs $516_1$ and $516_2$ may be combined into a single arbitration, and in such an example, ARB 520 may not be required.

A third inter-user arbitration level AL6 includes an ARB 520 to arbitrate inter-user winning FQ $518_1$ and inter-user winning FQ $518_2$ to select the inter-user winning FQ, from which a selected function 324 (e.g., the queue-front function), indicated at WF, is served to memory resource 312. ARB 520 may be any arbitration type (e.g., RR, WRR, or SR).

FIG. 6 shows a multi-user arbitration algorithm 600 to manage access to a memory resource 312 by multiple users. Multi-user arbitration algorithm 600 may represent another detailed example of the multi-user arbitration algorithm 400 shown in FIG. 4. Multi-user arbitration algorithm 600 may correspond with multi-user arbitration algorithm 346 shown in FIG. 3A and/or FIG. 3B. Thus, in some examples multi-user arbitration algorithm 600 may be stored and executed by digital logic circuitry 342 of a memory access controller 340a (see example system 300a shown in FIG. 3A) or stored in software 356 executable by a processor 350 of a memory access controller 340b (see example system 300b shown in FIG. 3B).

As shown, multi-user arbitration algorithm 600 includes an intra-user arbitration stage 602 and an inter-user arbitration stage 610 for arbitrating FQs assigned to User 1 through User N (also written as Users 1-N). In some examples, user configuration data 360 may be stored for Users 1-N, which may be utilized at least during the inter-user arbitration stage 610, as discussed below. For example, user configuration data 360 may include user class data 362 and/or user weight data 364 associated with each respective User 1-N.

User class data 362 may specify a user class assigned to each respective User 1-N. In the illustrated example, Users 1-N are selectively assigned to two user classes: UC1 and UC2. UC1 defines a "bandwidth allocation class," wherein each UC1 user is assigned a respective weight representing a respective bandwidth allocated to functions from the respective UC1 user, which may be defined based on a payment level of each respective UC1 user. UC2 defines a "best effort class," e.g., for non-paying or minimum-paying users, wherein all UC2 users have the same weight (or in other words, UC2 users are unweighted).

As shown in the illustrated example, User 1 is assigned to user class UC1 (bandwidth allocation class), and User 2 is assigned to user class UC2 (best effort class). Each other user may be assigned to user class UC1 or UC2.

User weight data 364 may specify a user weight assigned to each respective UC1 user based on any suitable parameters, e.g., based on a payment level of each respective UC1 user. In the illustrated example, user weight data 364 assigns a weight of 5 to User 1.

Figure 1A:
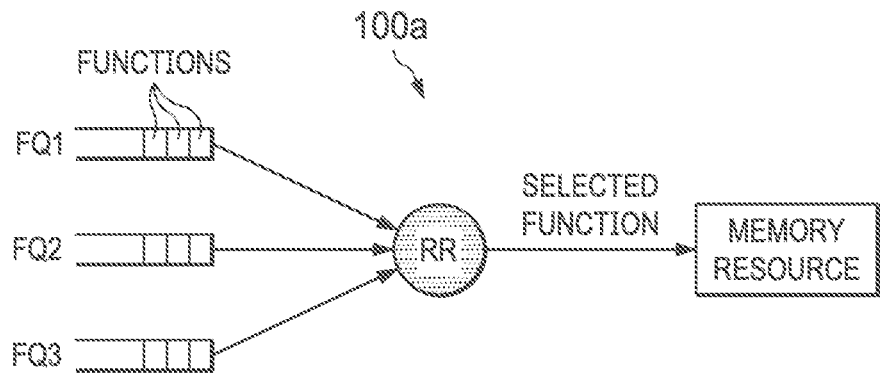
FIGS. 1A-1C illustrate three common arbitration algorithms for managing accessing to a memory resource.
Figure 1B:
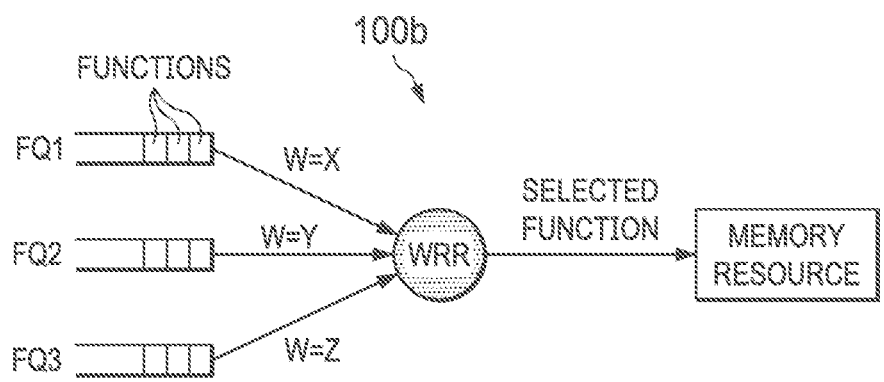
Figure 1C:
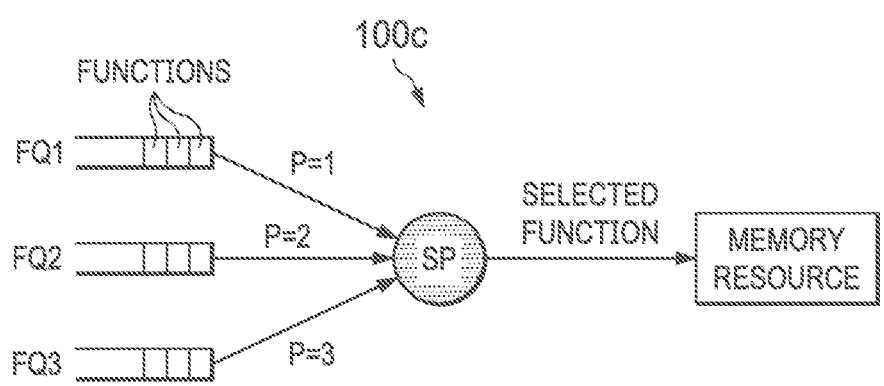
Figure 2:
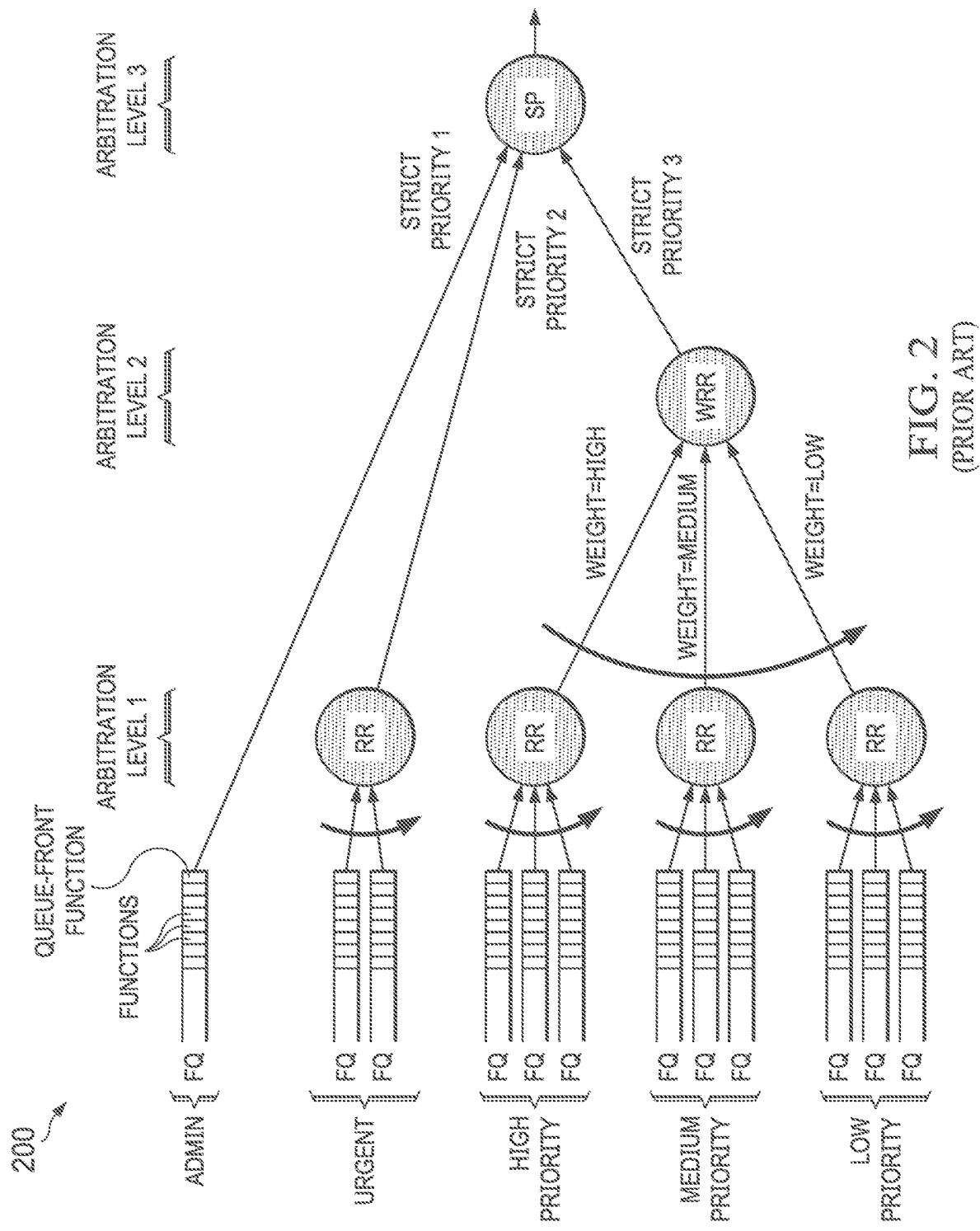
FIG. 2 shows an example representation of an arbitration protocol specified by an NVMe specification for arbitrating multiple functions from a single user.

The intra-user arbitration stage 602 includes multiple intra-user arbitration modules 604-1 through 604-N corresponding with Users 1-N. Each intra-user arbitration module 604 arbitrates FQs assigned to a respective User to select an intra-user winning FQ 606 for the respective User. In the illustrated example, each intra-user arbitration module 604 comprises an intra-user arbitration protocol defined by an NVMe specification, e.g., the example arbitration protocol 200 shown in FIG. 2 discussed above.

As shown, the arbitration protocol 600 defines five groups of FQs (Admin, Urgent, High Priority, Medium Priority, and Low Priority groups) for each respective User 1-N. Each intra-user arbitration module 604 includes three arbitration levels AL1, AL2, and AL3. AL1 includes a respective Round Robin (RR) arbitration for each of (a) Urgent FQs, (b) High Priority FQs, (c) Medium Priority FQs, and (d) Low Priority FQs. The High Priority, Medium Priority, and Low Priority FQs selected by RR arbitrations in AL1 are then arbitrated at AL2 using a Weighted Round Robin (WRR) arbitration, in which the selected High Priority FQ is assigned a high weight, the selected Medium Priority FQ is assigned a medium weight, and the selected Low Priority FQ is assigned a low weight. The high weight, medium weight, and low weight for the WRR arbitration in AL2 may have any suitable values, which may be independent of the user weights defined by user weight data 364. The FQ selected by the WRR arbitration in AL2 is then arbitrated with (a) the Urgent FQ selected by the RR arbitration in AL1 and (b) the Admin FQ using a Strict Priority (SP) arbitration at AL3. The priority levels (Strict Priority 1, Strict Priority 2, and Strict Priority 3) of the three arbitrated FQs are shown in FIG. 6. The FQ selected by the SP arbitration at AL3 defines an intra-user winning FQ 606 for the respective User 1-N.

The respective intra-user winning FQs 606 from Users 1-N are then arbitrated in the inter-user arbitration stage 610 to select an inter-user winning FQ, from which a selected function 324 is served to memory resource 312, as discussed below. The inter-user arbitration stage 610 includes two inter-user arbitration levels indicated as AL4 and AL5. AL4 includes two class-specific inter-user FQ arbitrations, namely (a) a UC1-specific WRR arbitration $612_1$ to arbitrate intra-user winning FQs $606_{UC1}$ selected for respective UC1 users (users in user class UC1) and (b) a UC2-specific RR arbitration $612_2$ to arbitrate intra-user winning FQs $606_{UC2}$ selected for respective UC2 users (users in user class UC2).

The UC1-specific WRR arbitration $612_1$ arbitrates intra-user winning FQs $606_{UC1}$ selected for UC1 users (bandwidth allocation class) based on the user weight associated with each respective intra-user winning FQ 606, including example intra-user winning FQ $606_{UC1,UW5}$ selected for User 1 (user weight=5), to select a UC1 winning FQ $614_1$, which is assigned a strict priority value of 1 (SP=1). In parallel, the UC2-specific RR arbitration $612_2$ arbitrates intra-user winning FQs $606_{UC2}$ selected for UC2 users (best effort class) in a round robin manner, to select a UC2 winning FQ $614_2$, which is assigned a strict priority value of 2 (SP=2). A strict priority (SP) arbitration 616 arbitrates the UC1 winning FQ $614_1$ (SP=1) and UC2 winning FQ $614_2$ (SP=2). According to the SP arbitration, the (higher priority) UC1 winning FQ $614_1$ is selected as the inter-user winning FQ unless no UC1 winning FQ $614_1$ is present (e.g., when there are currently no queued functions for any UC1 user), in which case the (lower priority) UC2 winning FQ $614_2$ is selected as the inter-user winning FQ. A selected function 324 (e.g., the queue-front function) in the selected inter-user winning FQ, indicated at WF, is then served to memory resource 312 for processing.

Figure 7:
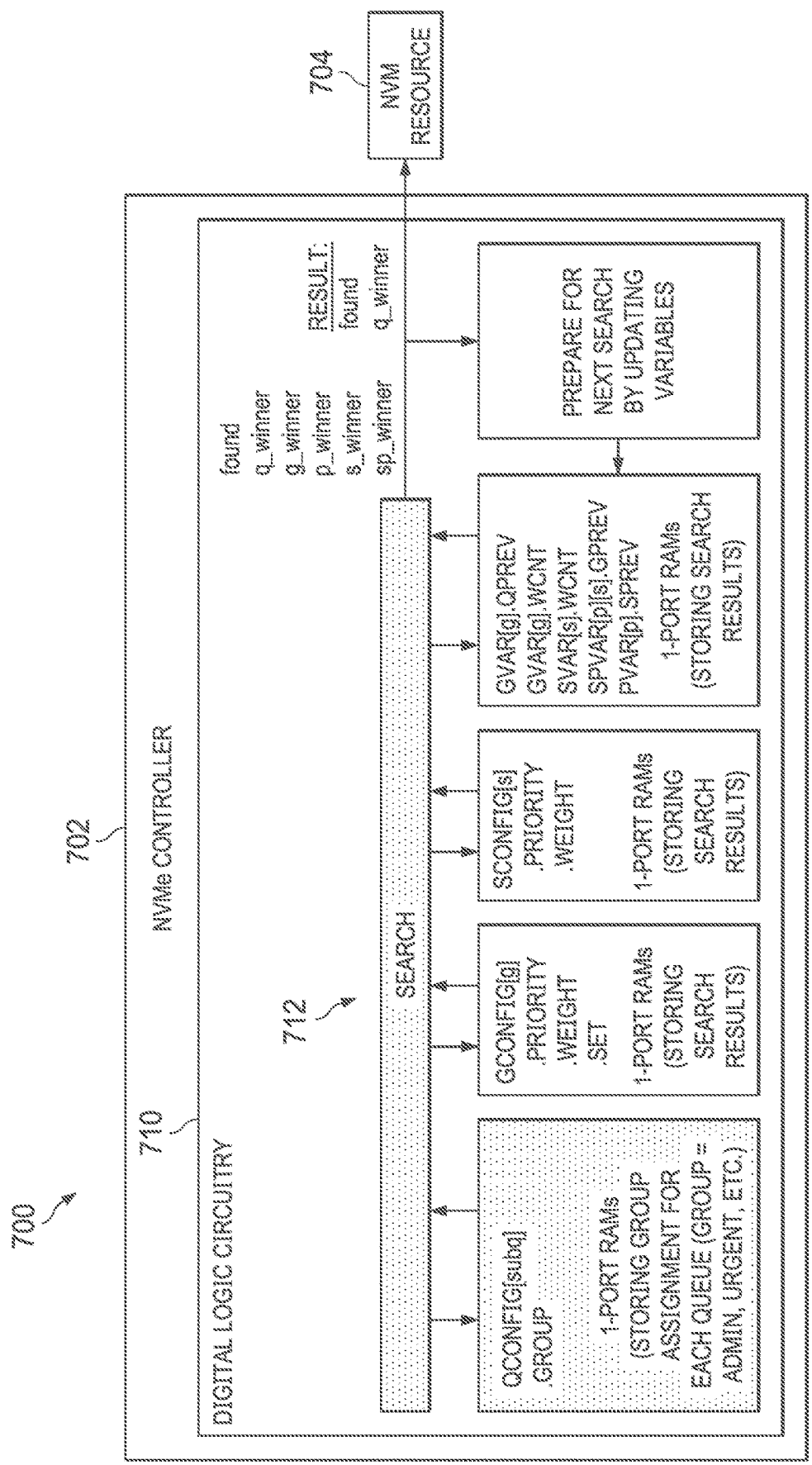
FIG. 7 shows an example NVMe controller including digital logic circuitry to execute a multi-user arbitration algorithm by a sequential search process to identify a winning function queue.

FIG. 7 shows an example system 700 including an example NVMe controller 702 that manages access to an NVM resource 704 by multiple users having associated FQs. NVMe controller 702 includes digital logic circuitry 710 that stores and executes a multi-user arbitration algorithm 712 by performing a series of arbitrations cycles to select a series of functions to serve to the NVM resource 704. For each arbitration cycle, digital logic circuitry 710 executes a sequential search process to identify an inter-user winning FQ, indicated as "found q_winner," and a selected function (e.g., the queue-front function) in the inter-user winning FQ is served to the NVM resource 704. During the sequential search process, digital logic circuitry 710 reads various configuration and variable data as it iterates through all FQs associated with the multiple users in a sequential manner, to determine the inter-user winning FQ (found q_winner). Associated with the q_winner, the winning group, winning group-priority, winning set, and winning set-priority are determined. These are described in the diagram as g_winner, p_winner, s_winner, and sp_winner, respectively. After selecting the inter-user winning FQ, digital logic circuitry 710 updates the variable data GVAR[g].QPREV with q_winner, decrements GVAR[g].WCNT and resets it to GCONFIG[g].WEIGHT when it reaches zero; decrements SVAR[s].WCNT and resets it to SCONFIG[s].WEIGHT when it reaches zero; updates SPVAR[p][s].GPREV with g_winner; and updates PVAR[p].SPREV with s_winner. In this example, these updated variables are stored in respective 1-port Random Access Memories (RAMs) in preparation for the next arbitration cycle. QPREV, GPREV and SPREV refer to the previous winning queue, group and set, respectively. In this example, digital logic circuitry 710 also comprises (a) 1-port RAMs storing a function categorization for each FQ (e.g. Admin, Urgent, High Priority, Medium Priority, or Low Priority), denoted QCONFIG[subq]. GROUP; (b) 1-port RAMs storing search results, denoted GCONFIG[g].PRIORITY, GCONFIG[g].WEIGHT and GCONFIG[g]. SET; and (c) 1-port RAMs storing search results, denoted SCONFIG[s].PRIORITY and SCONFIG[s].WEIGHT.

Figure 8:
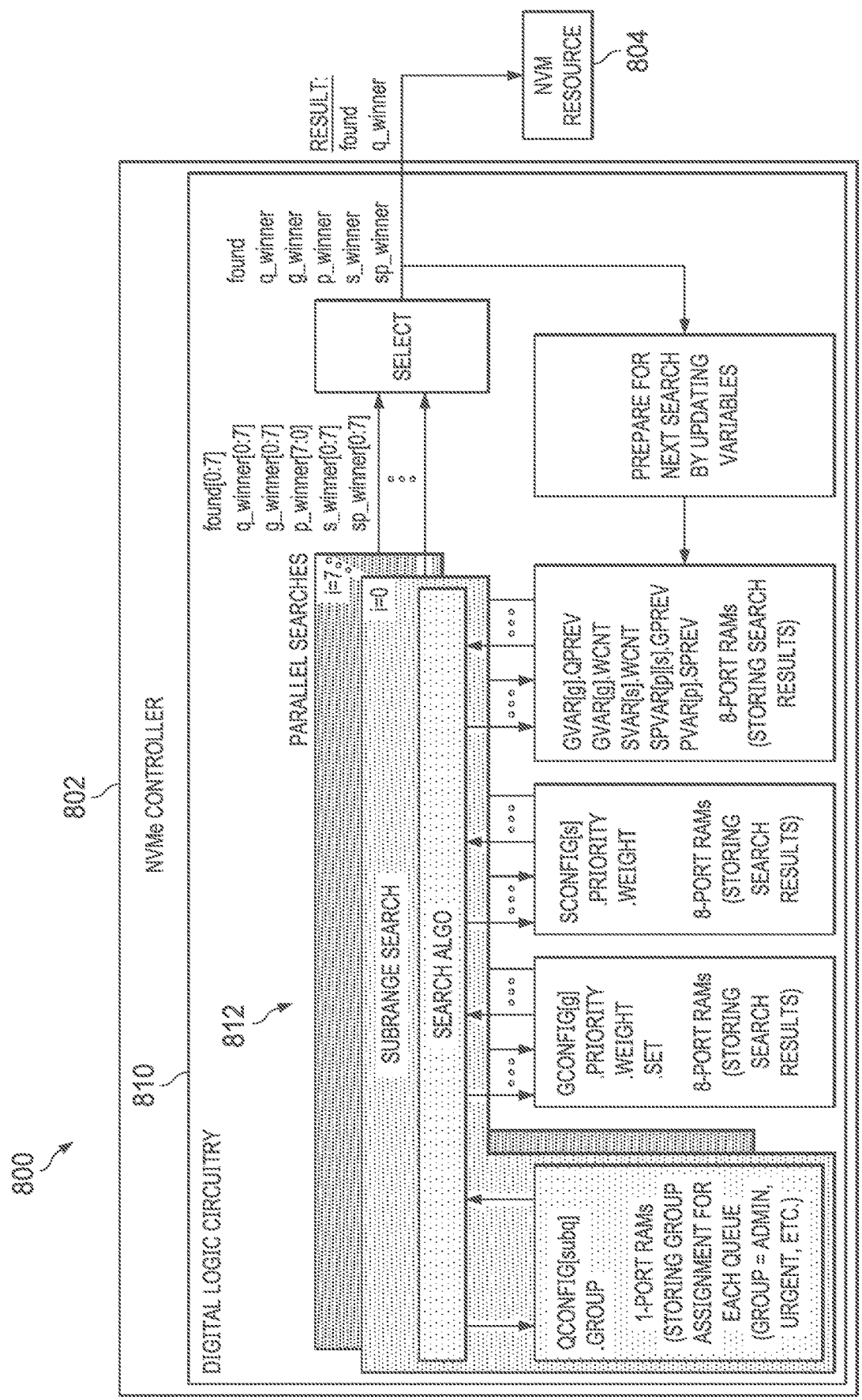
FIG. 8 shows an example NVMe controller including digital logic circuitry to execute a multi-user arbitration algorithm by a parallel search process to identify a winning function queue.

FIG. 8 shows an example system 800 including an example NVMe controller 802 that manages access to an NVM resource 804 by multiple users having associated FQs. NVMe controller 802 includes digital logic circuitry 810 that stores and executes a multi-user arbitration algorithm 812 by performing a series of arbitrations cycles to select a series of functions to serve to the NVM resource 804. For each arbitration cycle, digital logic circuitry 810 executes a parallel search process to identify an inter-user winning FQ (found q_winner), which may provide faster searching than the sequential search process performed by multi-user arbitration algorithm 712 discussed above.

The parallel search process includes multiple sequential searches executing in parallel, each of the multiple sequential searches comprising a sequential search of a respective subset of the total set of FQs associated with the multiple users. In the illustrated example, the parallel search process includes eight sequential searches executing in parallel, each of the eight sequential searches iterating through a respective subset of FQs. In one particular example, FQs 0-1024 are subdivided into eight FQ subranges: 0-127, 128-255, 256-383, 384-511, 512-639, 640-767, 768-895, and 896-1024. The multi-user arbitration algorithm 812 executed by digital logic circuitry 810 performs eight subrange searches in parallel, each subrange search including a sequential iteration through one of the eight FQ subranges to identify a respective subrange winning FQ, and the eight subrange winning FQs are arbitrated to select the inter-user winning FQ (found q_winner), and a selected function (e.g., the queue-front function) in the inter-user winning FQ is served to NVM resource 804. Digital logic circuitry 810 updates relevant variables (e.g., the variables GVAR[g].QPREV, GVAR[g].WCNT; SVAR[s].WCNT; SPVAR[p].GPREV; and PVAR[p].SPREV stored in respective 8-port RAMs) in preparation for the next arbitration cycle.

In the example shown in FIG. 8, each subrange search is provided exclusive access to a corresponding subrange of FQ configuration arrays, but shares access to group configuration, set configuration, and variable data arrays. In this example, the data arrays storing group assignment for each queue (e.g. admin, urgent, high, medium and low), denoted QCONFIG[subq].GROUP; search results for each queue, denoted GCONFIG[g].PRIORITY.WEIGHT.SET; and search results, denoted SCONFIG[s].PRIORITY.WEIGHT are stored in respective Random Access Memories (RAMs), for example 8-port RAMs, wherein each subrange search has access to the full data arrays. In other examples, the arrays may be stored in semiconductor memory or flipflops.

Some examples may include additional search selection criteria added to the configuration data. For example, a SKIP flag can be added per FQ, per FQ group, per user, or elsewhere as desired. These flags can be used to either include or exclude (skip) a particular FQ, FQ group, or user during a particular search. In one example, a SKIP flag can by controlled dynamically to reduce the bandwidth available to the respective FQ, FQ group, or user, for example. In addition, in some examples, the bandwidth for respective FQ groups or users may be dynamically controlled by dynamically adjusting weights assigned to different FQ groups or users.

Figure 9:
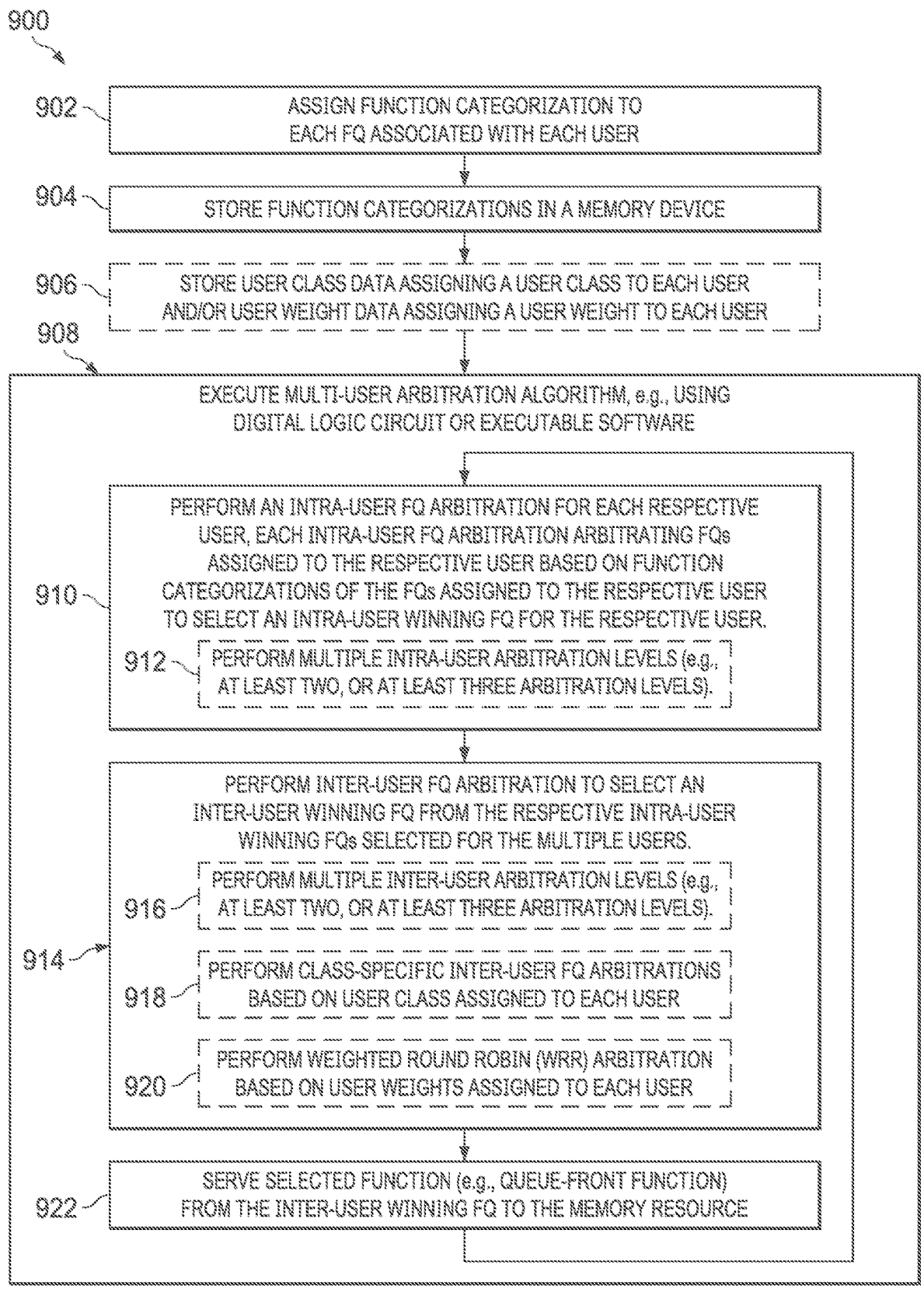
FIG. 9 shows an example method for managing access to a memory resource (e.g., NMV device) by multiple users.

FIG. 9 shows an example method 900 for managing access to a memory resource (e.g., NMV device) by multiple users. In some examples, method 900 may be executed by a memory access controller (e.g., an NVMe controller), e.g., using digital logic circuitry or executable software provided in the memory access controller.

At 902, FQ categorizations are assigned to FQs associated with each of multiple users. The FQ categorizations assign a respective function category to each FQ associated with each user. For example, each respective FQ may be assigned one of the following categories: Admin, Urgent, High Priority, Medium Priority, or Low Priority. At 904, the FQ categorizations may be stored in a memory device, e.g., a memory device provided in the memory access controller.

At 906 (optional), user class data assigning a user class to each user and/or user weight data assigning a user weight to each user may be stored in a memory device, e.g., a memory device provided in the memory access controller. User class data and/or user weight data may be used during an inter-user FQ arbitration, e.g., as discussed below at 918 and 920.

At 908, a multi-user arbitration algorithm is executed, e.g., using digital logic circuit or executable software provided in the memory access controller (e.g., NVMe controller), to select a function to serve to the memory resource (e.g., NMV device). As discussed below, the multi-user arbitration algorithm may include an intra-user FQ arbitration performed for each user, and an inter-user FQ arbitration of the results of the intra-user FQ arbitrations.

At 910, an intra-user FQ arbitration is performed for each user, to select an intra-user winning FQ for each respective user. The intra-user FQ arbitration for each respective user arbitrates the FQs assigned to the respective user based on FQ categorizations associated with the respective user to select an intra-user winning FQ for the respective user. For example, as shown in FIG. 6, in a first arbitration level (AL1), "Urgent" FQs for each respective user are arbitrated with each other, "Low Priority" FQs for each respective user are arbitrated with each other, "Medium Priority" FQs for each respective user are arbitrated with each other, and "High Priority" FQs for each respective user are arbitrated with each other. As indicated at 912 (optional), in some examples the intra-user FQ arbitration for each user may include multiple intra-user arbitration levels, e.g., at least two, or at least three intra-user arbitration levels.

At 914, an inter-user FQ arbitration is performed to select an inter-user winning FQ from the intra-user winning FQs selected for each of the multiple users. As indicated at 916 (optional), in some examples the inter-user FQ arbitration may include multiple inter-user arbitration levels, e.g., at least two, or at least three inter-user arbitration levels. As indicated at 918 (optional), in some examples the inter-user FQ arbitration may include multiple class-specific inter-user FQ arbitrations, each arbitrating intra-user winning FQs selected for users assigned to a particular user class, based on user class data stored at 906, discussed above. As indicated at 920 (optional), in some examples the inter-user FQ arbitration may include at least one weighted round robin (WRR) arbitration in which intra-user winning FQs are arbitrated based on user weights assigned to the user associated with each respective intra-user winning FQ, based on user weight data stored at 906, discussed above.

At 922, a selected function in the inter-user winning FQ (e.g., the queue-front function) is served to the memory resource (e.g., NVM device). The method may then return to 910 for a next arbitration cycle (to select a next function to serve to the memory resource).

The invention claimed is:

1. A system for managing access to a memory resource by multiple users, the system comprising:
   a memory storing function queue categorizations for a plurality of function queues associated with each respective user of the multiple users, wherein the function queue categorizations assign a respective function category of multiple predefined function categories to each respective function queue of the plurality of function queues associated with each respective user; and
   circuitry to store and execute a multi-user arbitration algorithm to:
     select an intra-user winning function queue for each respective user of the multiple users by performing, for each respective user, an intra-user function queue arbitration of the plurality of function queues associated with the respective user based at least on the function queue categorizations assigned to the respective function queues associated with the respective user;

after selecting the intra-user winning function queue for each respective user of the multiple users, select an inter-user winning function queue by performing an inter-user function queue arbitration of the respective intra-user winning function queues selected for each of the multiple users; and serve a function from the inter-user winning function queue to the memory resource.

2. The system of claim 1, wherein the system comprises a non-volatile memory express (NVMe) controller, and the memory resource comprises a non-volatile memory (NVM) device.

3. The system of claim 1, wherein zero, one, or multiple functions are queued in each function queue associated with each respective user.

4. The system of claim 1, wherein the intra-user function queue arbitration of the plurality of function queues associated with the respective user comprises a multi-level intra-user arbitration including at least two intra-user arbitration levels.

5. The system of claim 1, wherein the intra-user function queue arbitration of the plurality of function queues associated with each respective user comprises a multi-level arbitration including (a) an intra-user first arbitration level that selects multiple intra-user first level winning function queues, and (b) an intra-user second arbitration level that arbitrates the multiple intra-user first level winning function queues.

6. The system of claim 1, wherein the intra-user function queue arbitration of the plurality of function queues associated with each respective user comprises a multi-level intra-user arbitration including at least three intra-user arbitration levels.

7. The system of claim 1, wherein the inter-user function queue arbitration of the respective intra-user winning function queues selected for the multiple users comprises a multi-level arbitration including at least two inter-user arbitration levels.

8. The system of claim 1, wherein the inter-user function queue arbitration of the respective intra-user winning function queues selected for the multiple users comprises (a) an inter-user first arbitration level that selects multiple inter-user first level winning function queues, and (b) a second inter-user arbitration level that arbitrates the multiple first inter-user level winning function queues.

9. The system of claim 1, wherein the inter-user function queue arbitration of the respective intra-user winning function queues selected for the multiple users includes a round robin arbitration between function queues associated with different users.

10. The system of claim 1, wherein the inter-user function queue arbitration of the respective intra-user winning function queues selected for the multiple users includes a weighted round robin arbitration, wherein different weights are assigned to different users.

11. The system of claim 1, wherein:

the memory stores user class data assigning a user class to each respective user of the multiple users;

the multi-user arbitration algorithm defines multiple class-specific inter-user function queue arbitrations for arbitrating intra-user winning function queues; and the circuitry to store and execute the multi-user arbitration algorithm to select the inter-user winning function queue by performing the inter-user function queue arbitration of the respective intra-user winning function queues selected for each of the multiple users comprises circuitry to:

identify the user class assigned to each respective user of the multiple users;

assign the respective intra-user winning function queue selected for each respective user to one of the multiple class-specific inter-user function queue arbitrations based on the user class assigned to the respective user; and select a class-specific winning function queue for each of the multiple class-specific inter-user function queue arbitrations.

12. The system of claim 1, wherein:

the memory stores user weight data defining user weights assigned to at least some of the multiple users;

the circuitry to store and execute the multi-user arbitration algorithm to select the inter-user winning function queue by performing the inter-user function queue arbitration of the intra-user winning function queues selected for each of the multiple users comprises circuitry to:

perform a weighted round robin arbitration for a selected set of the intra-user winning function queues associated with a selected set of users based at least on user weights assigned to the selected set of users as defined by the user weight data.

13. The system of claim 1, wherein the circuitry to store and execute the multi-user arbitration algorithm comprises a digital logic circuit defining the multi-user arbitration algorithm.

14. The system of claim 1, wherein the circuitry to store and execute the multi-user arbitration algorithm comprises:

non-transitory computer-readable media storing instructions defining the multi-user arbitration algorithm; and a processor to execute the instructions to perform the multi-user arbitration algorithm.

15. A method for managing access to a memory resource by multiple users, the method comprising:

assigning function queue categorizations to each of a plurality of function queues associated with each respective user of the multiple users, the function queue categorizations assigning a respective function category of multiple predefined function categories to each respective function queue of the plurality of function queues associated with each respective user;

storing the function queue categorizations in a memory device; and using circuitry to execute a multi-user arbitration algorithm that arbitrates access to the memory resource by the multiple users, wherein executing the multi-user arbitration algorithm comprises:

selecting an intra-user winning function queue for each respective user of the multiple users by performing, for each respective user, an intra-user function queue arbitration of the plurality of function queues associated with the respective user based at least on the function queue categorizations assigned to the respective function queues associated with the respective user;

after selecting the intra-user winning function queue for each respective user of the multiple users, selecting an inter-user winning function queue by performing an inter-user function queue arbitration of the intra-user winning function queues selected for each of the multiple users; and serving a function from the inter-user winning function queue to the memory resource.

16. The method of claim 15, wherein the circuitry to execute the multi-user arbitration algorithm comprises a processor of a non-volatile memory express (NVMe) controller executing computer-readable instructions defining the multi-user arbitration algorithm.

17. The method of claim 15, wherein the circuitry to execute the multi-user arbitration algorithm comprises a digital logic circuit of a non-volatile memory express (NVMe) controller.

18. The method of claim 15, serving a function from the inter-user winning function queue to the memory resource comprises serving a queue-front function from the inter-user winning function queue to the memory resource.

19. The method of claim 15, wherein zero, one, or multiple functions are queued in each function queue associated with the respective user.

20. The method of claim 15, wherein performing the intra-user function queue arbitration of the plurality of function queues associated with each respective user comprises performing a multi-level intra-user arbitration including at least two intra-user arbitration levels.

21. The method of claim 15, wherein performing the intra-user function queue arbitration of the plurality of function queues associated with each respective user comprises performing a multi-level intra-user arbitration including (a) executing an intra-user first arbitration level that selects multiple intra-user first level winning function queues, and (b) executing an intra-user second arbitration level that arbitrates the multiple intra-user first level winning function queues.

22. The method of claim 15, wherein performing the intra-user function queue arbitration of the plurality of function queues associated with each respective user comprises performing a multi-level intra-user arbitration including at least three intra-user arbitration levels.

23. The method of claim 15, wherein performing the inter-user function queue arbitration of the intra-user winning function queues selected for each of the multiple users comprises performing a multi-level inter-user arbitration including at least two inter-user arbitration levels.

24. The method of claim 15, wherein performing the inter-user function queue arbitration of the intra-user winning function queues selected for each of the multiple users comprises performing a multi-level inter-user arbitration including (a) executing an inter-user first arbitration level that selects multiple inter-user first level winning function queues, and (b) executing a second inter-user arbitration level that arbitrates the multiple first inter-user level winning function queues.

25. The method of claim 15, wherein performing the inter inter-user function queue arbitration of the intra-user winning function queues selected for each of the multiple users includes performing a weighted round robin arbitration, wherein different weights are assigned to different users.

26. The method of claim 15, comprising:
storing user class data assigning a user class to each respective user of the multiple users; and
wherein selecting the inter-user winning function queue by performing the inter-user function queue arbitration of the intra-user winning function queues selected for each of the multiple users comprises:
identifying the user class assigned to each respective user of the multiple users;
assigning the respective intra-user winning function queue selected for each respective user to one of multiple class-specific inter-user function queue arbitrations based on the user class assigned to the respective user; and
selecting a class-specific winning function queue for each of the multiple class-specific inter-user function queue arbitrations.

27. The method of claim 15, comprising:
storing user weight data defining user weights assigned to at least some of the multiple users; and
wherein selecting the inter-user winning function queue by performing the inter-user function queue arbitration of the intra-user winning function queues selected for each of the multiple users comprises:
performing a weighted round robin arbitration for a selected set of the intra-user winning function queues associated with a selected set of users based at least on user weights assigned to the selected set of users as defined by the user weight data.

* * * * *